(12) United States Patent
Ratte et al.

(10) Patent No.: US 9,190,654 B2
(45) Date of Patent: Nov. 17, 2015

(54) BATTERY PARTS AND ASSOCIATED SYSTEMS AND METHODS

(71) Applicant: Water Gremlin Company, White Bear Lake, MN (US)

(72) Inventors: Robert W. Ratte, North Oaks, MN (US); Norman E. Peterson, Wyoming, MN (US); Tracy L. Cain, Forest Lake, MN (US)

(73) Assignee: Water Gremlin Company, White Bear Lake, MN (US)

( * ) Notice: Subject to any disclaimer, the term of this patent is extended or adjusted under 35 U.S.C. 154(b) by 0 days.

(21) Appl. No.: 14/225,239

(22) Filed: Mar. 25, 2014

(65) Prior Publication Data

US 2014/0201981 A1 Jul. 24, 2014

Related U.S. Application Data

(60) Division of application No. 12/533,413, filed on Jul. 31, 2009, now Pat. No. 8,701,743, which is a continuation-in-part of application No. 11/011,362, filed on Dec. 13, 2004, now abandoned, which is a continuation-in-part of application No. 10/804,401, filed on Mar. 18, 2004, now Pat. No. 7,338,539.

(60) Provisional application No. 60/533,924, filed on Jan. 2, 2004, provisional application No. 60/533,924, filed on Jan. 2, 2004.

(51) Int. Cl.
*H01M 2/30* (2006.01)
*B22D 25/04* (2006.01)

(52) U.S. Cl.
CPC ............... *H01M 2/30* (2013.01); *B22D 25/04* (2013.01); *H01M 2/307* (2013.01); *Y10T 29/49108* (2015.01)

(58) Field of Classification Search
CPC ............................. H01M 2/30; H01M 2/307
See application file for complete search history.

(56) References Cited

U.S. PATENT DOCUMENTS

| 1,248,768 A | 12/1917 | Willard |
| 1,326,936 A | 1/1920 | Jeans et al. |
| 1,411,414 A | 4/1922 | Cook |

(Continued)

FOREIGN PATENT DOCUMENTS

| CA | 645083 | 7/1962 |
| CA | 2103759 | 3/1994 |

(Continued)

OTHER PUBLICATIONS

U.S. Appl. No. 11/709,365, filed Feb. 22, 2007, Ratte.

(Continued)

*Primary Examiner* — Helen O Conley
(74) *Attorney, Agent, or Firm* — Perkins Coie LLP

(57) ABSTRACT

Battery parts, such as battery terminals, and associated systems and methods for making same. In one embodiment, a battery part has a sealing region or sealing bead located on a lateral face of an acid ring for increasing resistance to leakage therepast as the battery container shrinks. Another embodiment includes a forming assembly for use with, for example, a battery part having a bifurcated acid ring with spaced apart lips. The forming assembly can include movable forming members that can be driven together to peen, crimp, flare or otherwise form the lips on the bifurcated acid ring.

20 Claims, 11 Drawing Sheets

(56) References Cited

U.S. PATENT DOCUMENTS

| | | |
|---|---|---|
| 1,947,158 A | 2/1934 | Henry |
| 1,982,801 A | 12/1934 | Gerking |
| 1,983,618 A | 12/1934 | Lamond |
| 2,100,333 A | 11/1937 | Hess |
| 2,194,092 A | 3/1940 | Lund et al. |
| 2,500,556 A | 3/1950 | Mallach |
| 2,510,100 A | 6/1950 | Goss |
| 2,599,706 A | 6/1952 | Friedman |
| 2,678,960 A | 5/1954 | Jensen |
| 2,901,527 A | 8/1959 | Mocas |
| 3,096,579 A | 7/1963 | Waller |
| 3,101,534 A | 8/1963 | Lange |
| 3,113,892 A | 12/1963 | Albrecht |
| 3,186,209 A | 6/1965 | Friedman |
| 3,280,613 A | 10/1966 | Schrom |
| 3,292,218 A | 12/1966 | Kozma, Jr. |
| 3,344,848 A | 10/1967 | Hall et al. |
| 3,381,515 A | 5/1968 | Orloff |
| 3,534,802 A | 10/1970 | Carr |
| 3,554,272 A | 1/1971 | Lauth |
| 3,709,459 A | 1/1973 | Bushrod |
| 3,736,642 A | 6/1973 | Miller et al. |
| 3,744,112 A | 7/1973 | Lindenberg et al. |
| 3,793,086 A | 2/1974 | Badger |
| 3,808,663 A | 5/1974 | McLane |
| 3,835,686 A | 9/1974 | Lawson et al. |
| 3,842,646 A | 10/1974 | Kuhn |
| 3,847,118 A | 11/1974 | Ambry |
| 3,945,097 A | 3/1976 | Daniels, Jr. et al. |
| 3,945,428 A | 3/1976 | Yanagisawa et al. |
| 3,947,936 A | 4/1976 | Wheadon |
| 3,992,759 A | 11/1976 | Farmer |
| 4,034,793 A | 7/1977 | Okura et al. |
| 4,041,755 A | 8/1977 | Rut |
| 4,049,040 A | 9/1977 | Lynch |
| 4,062,613 A | 12/1977 | Tritenne |
| 4,079,911 A | 3/1978 | Wirtz et al. |
| 4,083,478 A | 4/1978 | McLane |
| 4,100,674 A | 7/1978 | Tiegel |
| 4,146,771 A | 3/1979 | Tiegel |
| 4,160,309 A | 7/1979 | Scholle |
| 4,168,618 A | 9/1979 | Saier et al. |
| 4,177,551 A | 12/1979 | Johnson et al. |
| 4,212,934 A | 7/1980 | Salamon et al. |
| 4,266,597 A | 5/1981 | Eberle |
| 4,284,122 A | 8/1981 | Oxenreider et al. |
| 4,291,568 A | 9/1981 | Stifano, Jr. |
| 4,352,283 A | 10/1982 | Bailey |
| 4,362,043 A | 12/1982 | Hanson |
| 4,377,197 A | 3/1983 | Oxenreider et al. |
| 4,394,059 A | 7/1983 | Reynolds |
| 4,406,146 A | 9/1983 | Suzuki |
| 4,416,141 A | 11/1983 | Nippert |
| 4,422,236 A | 12/1983 | Ware, Jr. et al. |
| 4,423,617 A | 1/1984 | Nippert |
| 4,430,396 A | 2/1984 | Hayes, Jr. |
| 4,469,720 A | 9/1984 | Morris |
| 4,480,393 A | 11/1984 | Flink et al. |
| 4,494,967 A | 1/1985 | Barth |
| 4,495,260 A | 1/1985 | Hardigg et al. |
| 4,497,359 A | 2/1985 | Suzuki et al. |
| 4,505,307 A | 3/1985 | Uchida |
| 4,574,005 A | 3/1986 | Cobbs, Jr. et al. |
| 4,580,431 A | 4/1986 | Oku et al. |
| 4,592,405 A | 6/1986 | Allen |
| 4,600,608 A | 7/1986 | Ankrett |
| 4,610,581 A | 9/1986 | Heinlein |
| 4,614,630 A | 9/1986 | Pluim, Jr. |
| 4,662,205 A | 5/1987 | Ratte |
| 4,683,647 A | 8/1987 | Brecht et al. |
| 4,744,540 A | 5/1988 | Salamon et al. |
| 4,753,283 A | 6/1988 | Nakano |
| 4,775,604 A | 10/1988 | Dougherty et al. |
| 4,776,197 A | 10/1988 | Scott |
| 4,779,443 A | 10/1988 | Hoshi |
| 4,779,665 A | 10/1988 | Ouimet |
| 4,835,711 A | 5/1989 | Hutchins et al. |
| 4,852,634 A | 8/1989 | Kawai et al. |
| 4,859,216 A | 8/1989 | Fritsch |
| 4,859,547 A | 8/1989 | Adams et al. |
| 4,874,032 A | 10/1989 | Hatamura |
| 4,879,191 A | 11/1989 | Sindorf |
| 4,938,276 A | 7/1990 | Noguchi et al. |
| 4,945,749 A | 8/1990 | Walker et al. |
| 4,967,827 A | 11/1990 | Campbell |
| 4,998,206 A | 3/1991 | Jones et al. |
| 5,016,460 A | 5/1991 | England et al. |
| 5,048,590 A | 9/1991 | Carter |
| 5,072,772 A | 12/1991 | Haehne |
| 5,074,352 A | 12/1991 | Suzuki |
| 5,077,892 A | 1/1992 | Nugent |
| 5,108,668 A | 4/1992 | Kallup |
| 5,125,450 A | 6/1992 | Kidd et al. |
| 5,143,141 A | 9/1992 | Frulla |
| 5,146,974 A | 9/1992 | Mayer et al. |
| 5,170,835 A | 12/1992 | Eberle et al. |
| 5,180,643 A | 1/1993 | Nedbal |
| 5,244,033 A | 9/1993 | Ueno |
| 5,273,845 A | 12/1993 | McHenry et al. |
| 5,290,646 A | 3/1994 | Asao et al. |
| 5,296,317 A | 3/1994 | Ratte et al. |
| 5,316,505 A | 5/1994 | Kipp |
| 5,326,655 A | 7/1994 | Mix et al. |
| 5,343,927 A | 9/1994 | Ivansson |
| 5,349,840 A | 9/1994 | Ratte et al. |
| 5,373,720 A | 12/1994 | Ratte et al. |
| 5,380,603 A | 1/1995 | Hooke |
| 5,415,219 A | 5/1995 | Wiedenmann et al. |
| 5,422,202 A | 6/1995 | Spiegelberg et al. |
| 5,445,907 A | 8/1995 | Ito et al. |
| 5,458,032 A | 10/1995 | Spiegelberg |
| 5,499,449 A | 3/1996 | Carter et al. |
| 5,511,605 A | 4/1996 | Iwamoto |
| 5,580,685 A | 12/1996 | Schenk |
| 5,584,730 A | 12/1996 | Tabata et al. |
| 5,595,511 A | 1/1997 | Okada et al. |
| 5,606,887 A | 3/1997 | Spiegelberg et al. |
| 5,623,984 A | 4/1997 | Nozaki et al. |
| 5,632,173 A | 5/1997 | Spiegelberg et al. |
| 5,655,400 A | 8/1997 | Spiegelberg et al. |
| 5,660,946 A | 8/1997 | Kump et al. |
| 5,663,015 A | 9/1997 | Hooke et al. |
| 5,671,797 A | 9/1997 | Nozaki et al. |
| 5,672,442 A | 9/1997 | Burnett |
| 5,686,202 A | 11/1997 | Hooke et al. |
| 5,704,119 A | 1/1998 | Ratte et al. |
| 5,709,967 A | 1/1998 | Larsen |
| 5,725,043 A | 3/1998 | Schaefer et al. |
| 5,730,203 A | 3/1998 | Mogensen |
| 5,746,267 A | 5/1998 | Yun et al. |
| 5,752,562 A | 5/1998 | Sparks |
| 5,758,711 A | 6/1998 | Ratte |
| 5,778,962 A | 7/1998 | Garza-Ondarza et al. |
| 5,785,110 A | 7/1998 | Guergov |
| 5,791,183 A | 8/1998 | Spiegelberg et al. |
| 5,814,421 A | 9/1998 | Spiegelberg et al. |
| 5,836,372 A | 11/1998 | Kono |
| 5,862,853 A | 1/1999 | Eliat |
| 5,887,641 A | 3/1999 | Iwamoto et al. |
| 5,908,065 A | 6/1999 | Chadwick et al. |
| 5,924,471 A | 7/1999 | Lund et al. |
| 6,001,506 A | 12/1999 | Timmons et al. |
| 6,030,723 A | 2/2000 | Nagano et al. |
| 6,033,801 A | 3/2000 | Casais |
| 6,082,937 A | 7/2000 | Ratte |
| 6,123,142 A | 9/2000 | Ratte |
| 6,152,785 A | 11/2000 | Haller et al. |
| 6,155,889 A | 12/2000 | Scarla et al. |
| 6,183,905 B1 | 2/2001 | Ling et al. |
| 6,202,733 B1 | 3/2001 | Ratte |
| 6,255,617 B1 | 7/2001 | Farmer et al. |
| 6,258,481 B1 | 7/2001 | Ross et al. |
| 6,267,171 B1 | 7/2001 | Onuki et al. |
| 6,363,996 B1 | 4/2002 | Ratte |

(56) References Cited

U.S. PATENT DOCUMENTS

| | | |
|---|---|---|
| 6,405,786 B1 | 6/2002 | Ratte |
| 6,499,530 B2 | 12/2002 | Ratte |
| 6,506,448 B1 | 1/2003 | Minogue |
| 6,513,570 B2 | 2/2003 | Ratte |
| 6,564,853 B1 | 5/2003 | Ratte |
| 6,598,658 B2 | 7/2003 | Ratte |
| 6,613,163 B1 | 9/2003 | Pfeifenbring et al. |
| 6,644,084 B1 | 11/2003 | Spiegelberg |
| 6,684,935 B2 | 2/2004 | Ratte |
| 6,701,998 B2 | 3/2004 | Ratte |
| 6,803,146 B2 | 10/2004 | Key et al. |
| 6,806,000 B2 | 10/2004 | Misra et al. |
| 6,830,490 B2 | 12/2004 | Murakami et al. |
| 6,864,015 B2 | 3/2005 | Peterson et al. |
| 6,866,087 B2 | 3/2005 | Ratte |
| 6,896,031 B2 | 5/2005 | Ratte |
| 6,902,095 B2 | 6/2005 | Ratte et al. |
| 6,908,640 B2 | 6/2005 | Ratte et al. |
| 6,929,051 B2 | 8/2005 | Peterson et al. |
| 6,982,131 B1 | 1/2006 | Hamada et al. |
| 6,997,234 B2 | 2/2006 | Peterson |
| 7,021,101 B2 | 4/2006 | Spiegelberg |
| 7,029,589 B2 | 4/2006 | McGinness |
| 7,070,441 B1 | 7/2006 | Gregory et al. |
| 7,074,516 B2 | 7/2006 | Davidson et al. |
| 7,163,763 B2 | 1/2007 | Spiegelberg et al. |
| 7,163,764 B2 | 1/2007 | Ratte |
| 7,246,650 B2 | 7/2007 | Peterson |
| 7,338,539 B2 | 3/2008 | Ratte et al. |
| 7,390,364 B2 | 6/2008 | Ratte et al. |
| 8,202,328 B2 | 6/2012 | Ratte et al. |
| 8,497,036 B2 | 7/2013 | Garin et al. |
| 8,512,891 B2 | 8/2013 | Ratte |
| 8,701,743 B2 | 4/2014 | Ratte et al. |
| 8,802,282 B2 | 8/2014 | Garin et al. |
| 2001/0031394 A1 | 10/2001 | Hansen et al. |
| 2002/0002772 A1 | 1/2002 | Hirano et al. |
| 2002/0114994 A1 | 8/2002 | Yabuki et al. |
| 2003/0017391 A1 | 1/2003 | Peterson et al. |
| 2003/0017392 A1 | 1/2003 | Key et al. |
| 2003/0207172 A1 | 11/2003 | Misra et al. |
| 2003/0224248 A1 | 12/2003 | Spiegelberg et al. |
| 2004/0044071 A1 | 3/2004 | Fischer et al. |
| 2005/0042509 A1 | 2/2005 | Key et al. |
| 2005/0084751 A1 | 4/2005 | Ratte |
| 2005/0147881 A1 | 7/2005 | Ratte et al. |
| 2005/0147882 A1 | 7/2005 | Ratte et al. |
| 2005/0153202 A1 | 7/2005 | Ratte et al. |
| 2005/0155737 A1 | 7/2005 | Ratte |
| 2005/0238955 A1 | 10/2005 | Hooke et al. |
| 2006/0068279 A1 | 3/2006 | Spiegelberg et al. |
| 2006/0127693 A1 | 6/2006 | Peslerbe et al. |
| 2008/0038633 A1 | 2/2008 | Ratte et al. |
| 2009/0047574 A1 | 2/2009 | Hellmann |
| 2009/0229781 A1 | 9/2009 | Ratte |
| 2009/0246618 A1 | 10/2009 | Dirks |
| 2010/0033239 A1 | 2/2010 | Nakagawa et al. |
| 2010/0116455 A1 | 5/2010 | Ratte et al. |
| 2010/0291435 A1 | 11/2010 | Garin et al. |
| 2011/0045336 A1 | 2/2011 | Ratte et al. |
| 2011/0174459 A1 | 7/2011 | Garin et al. |
| 2011/0250493 A1 | 10/2011 | Balzan et al. |
| 2011/0262806 A1 | 10/2011 | Balzan et al. |
| 2013/0029213 A1 | 1/2013 | Cain et al. |
| 2014/0083642 A1 | 3/2014 | Ratte |
| 2014/0201981 A1 | 7/2014 | Ratte et al. |
| 2014/0259646 A1 | 9/2014 | Cain |
| 2014/0322594 A1 | 10/2014 | Garin et al. |

FOREIGN PATENT DOCUMENTS

| | | |
|---|---|---|
| CA | 2459031 | 3/1994 |
| CA | 2558525 | 4/2007 |
| CH | 321596 | 5/1957 |
| CH | 371154 | 8/1963 |
| DE | 523104 | 4/1931 |
| DE | 1146149 B | 3/1963 |
| DE | 2645977 | 4/1978 |
| DE | 134330 C | 2/1979 |
| DE | 3132292 A1 | 3/1983 |
| DE | 3230628 | 12/1983 |
| DE | 3401354 | 7/1985 |
| DE | 3502675 | 7/1986 |
| DE | 3942175 | 6/1991 |
| DE | 4127956 | 2/1993 |
| DE | 4241393 | 7/1994 |
| DE | 19635075 A1 | 3/1998 |
| EP | 0040951 | 12/1981 |
| EP | 0117213 A1 | 8/1984 |
| EP | 0244683 | 11/1987 |
| EP | 0261311 | 3/1988 |
| EP | 0284068 A1 | 9/1988 |
| EP | 0319128 | 6/1989 |
| EP | 0344042 A1 | 11/1989 |
| EP | 0448792 A2 | 10/1991 |
| EP | 0559920 | 9/1993 |
| EP | 0590284 | 4/1994 |
| EP | 0601268 | 6/1994 |
| EP | 0633081 | 1/1995 |
| EP | 0809327 | 11/1997 |
| EP | 0878856 | 11/1998 |
| EP | 0941554 | 9/1999 |
| EP | 1291940 | 3/2003 |
| ES | 2097388 T3 | 4/1997 |
| FR | 2504424 | 10/1982 |
| GB | 297904 | 10/1928 |
| GB | 386159 A | 1/1933 |
| GB | 1236495 | 6/1971 |
| GB | 1245255 A | 9/1971 |
| GB | 1257963 A | 12/1971 |
| GB | 1352882 | 5/1974 |
| GB | 2141654 | 1/1985 |
| GB | 2315695 | 2/1998 |
| JP | 54144931 A | 11/1979 |
| JP | 55057259 | 4/1980 |
| JP | 56159054 | 12/1981 |
| JP | 56165359 A | 12/1981 |
| JP | 58209861 A | 12/1983 |
| JP | 59029357 | 2/1984 |
| JP | 61008846 | 1/1986 |
| JP | 61096660 | 5/1986 |
| JP | 61189860 | 8/1986 |
| JP | 01124954 | 5/1989 |
| JP | 01239762 | 9/1989 |
| JP | 01243369 | 9/1989 |
| JP | 2155557 | 6/1990 |
| JP | 02234347 | 9/1990 |
| JP | 2247036 A | 10/1990 |
| JP | 03049152 | 3/1991 |
| JP | 03263756 | 11/1991 |
| JP | 4135042 | 5/1992 |
| JP | 04206459 | 7/1992 |
| JP | 04223047 | 8/1992 |
| JP | 05283057 | 10/1993 |
| JP | 05325940 | 12/1993 |
| JP | 06015402 | 1/1994 |
| JP | 06020663 | 1/1994 |
| JP | 06196136 | 7/1994 |
| JP | 06223812 | 8/1994 |
| JP | 07211308 | 8/1995 |
| JP | 7211309 | 8/1995 |
| JP | 7235286 A | 9/1995 |
| JP | 08171897 | 7/1996 |
| JP | 08273656 | 10/1996 |
| JP | 09045309 | 2/1997 |
| JP | 09130460 | 5/1997 |
| JP | 09167610 | 6/1997 |
| JP | 09237615 | 9/1997 |
| JP | 09312151 | 12/1997 |
| JP | 09320630 | 12/1997 |
| JP | 10116602 | 5/1998 |
| JP | 10144289 | 5/1998 |
| JP | 10208714 | 8/1998 |

(56) References Cited

FOREIGN PATENT DOCUMENTS

| | | |
|---|---|---|
| JP | 11045698 | 2/1999 |
| JP | 11045699 | 2/1999 |
| JP | 11135102 | 5/1999 |
| JP | 11176415 | 7/1999 |
| JP | 2000021367 | 1/2000 |
| JP | 2000164199 | 6/2000 |
| JP | 2001256955 A | 9/2001 |
| JP | 2001307714 | 11/2001 |
| JP | 2001006655 | 12/2001 |
| JP | 2002025536 | 1/2002 |
| JP | 2002050327 | 2/2002 |
| JP | 2002175795 | 6/2002 |
| JP | 2002270150 | 9/2002 |
| JP | 2003007281 | 1/2003 |
| JP | 2003242946 | 8/2003 |
| JP | 2003317677 | 11/2003 |
| JP | 2003317698 | 11/2003 |
| JP | 2003346777 | 12/2003 |
| JP | 2003346778 | 12/2003 |
| JP | 2004039401 | 2/2004 |
| JP | 2004228013 | 8/2004 |
| JP | 2004228046 | 8/2004 |
| JP | 2004235050 | 8/2004 |
| JP | 2004281145 | 10/2004 |
| JP | 2005078856 | 3/2005 |
| JP | 2005116243 | 4/2005 |
| JP | 2005116387 | 4/2005 |
| JP | 2005142009 | 6/2005 |
| JP | 2006331784 | 12/2006 |
| JP | 2007157611 A | 6/2007 |
| KR | 2038630 | 5/2002 |
| KR | 3044813 | 6/2003 |
| SU | 688279 A1 | 9/1979 |
| WO | WO-94/02272 | 2/1994 |
| WO | WO-99/07029 | 2/1999 |
| WO | WO-2005067513 | 7/2005 |
| WO | WO-2005119813 A2 | 12/2005 |
| WO | WO-2008032348 | 3/2008 |
| WO | WO-2009142621 A1 | 11/2009 |
| WO | WO-2010033239 A1 | 3/2010 |
| WO | WO-2010127289 A1 | 11/2010 |

OTHER PUBLICATIONS

U.S. Appl. No. 12/029,447, filed Feb. 11, 2008, Ratte.

Colombian Examination Report; Colombian Patent Application No. 99065069; International Filing Date: Oct. 13, 1999; Applicant: Water Gremlin Company; Mailing Date: Mar. 4, 2009.

European Search Report; European Patent Application No. 03023874.5; Applicant: Water Gremlin Company; Mailing Date: Apr. 27, 2010.

European Search Report; European Patent Application No. 04816050.1; Applicant: Water Gremlin Company; Mailing Date: Mar. 3, 2009.

European Search Report; European Patent Application No. 10196207; Applicant: Water Gremlin Company; Mailing Date: Feb. 28, 2011.

Examination Report; European Patent Application No. 04816050.1; Applicant: Water Gremlin Company; Mailing Date: Jul. 14, 2009.

Examination Report; European Patent Application No. 10196207.4, Applicant: Water Gremlin Company; Mailing Date: Feb. 22, 2013.

Examination Report; European Patent Application No. 10196207.4, Applicant: Water Gremlin Company; Mailing Date: Jun. 27, 2014, 5 pages.

Extended European Search Report; Application No. 08755902.7, mailed Nov. 27, 2012, 6 pages.

Extended European Search Report; Application No. 10770446.2, mailed Jul. 8, 2013, 4 pages.

Final Office Action, U.S. Appl. No. 11/011,362, Mailed on Aug. 31, 2009, 11 pages.

Final Office Action, U.S. Appl. No. 11/058,625, Mailed on Mar. 6, 2006, 5 pages.

Final Office Action, U.S. Appl. No. 11/058,625, Mailed on Jul. 5, 2006, 6 pages.

Final Office Action, U.S. Appl. No. 11/709,365, Mailed on Nov. 21, 2008, 9 pages.

Final Office Action; U.S. Appl. No. 12/771,714; Mailed on Nov. 29, 2012; 11 pages.

Final Office Action; U.S. Appl. No. 13/046,643; Mailed on May 2, 2014; 10 pages.

Final Office Action; U.S. Appl. No. 13/539,159; Mailed on Dec. 13, 2013; 25 pages.

Final Office Action; U.S. Appl. No. 13/971,674; Mailed on Sep. 11, 2014; 7 pages.

Gould Drawing No. 8RD5538, "Cold Forged Positive Lead Terminal Bushing for Plastic Covers", Gould Auto. Div., St. Paul, Minn., May 3, 1974.

Gould Drawing No. 8RD5539, "Cold Forged Negative Lead Terminal Bushing for Plastic Covers", Gould Auto. Div., St. Paul, Minn., May 3, 1974.

Heller, Machine translation of EP 0601268—May 1993, EPO, 2 pages.

HPM Corporation. HPM Tech Data-Thixomolding. Feb. 1992, 1 page, place of publication unknown.

HPM, Thixomolding Utilizes Injection Molding . . . Date unknown, 2 page advertisement, place of publication unknown.

International Search Report and Written Opinion; International Patent Application No. PCT/US04/44071; Filed: Dec. 21, 2004; Applicant: Water Gremlin Company; Mailed on Dec. 22, 2005.

International Search Report and Written Opinion; International Patent Application No. PCT/US08/64161; Filed: May 19, 2008; Applicant: Ferrari, Paolo; Mailed on Aug. 15, 2008.

International Search Report and Written Opinion; International Patent Application No. PCT/US10/43973; Filed: Jul. 30, 2010; Applicant: Water Gremlin Company; Mailed on Dec. 16, 2010.

International Search Report and Written Opinion; International Patent Application No. PCT/US2010/033239; Filed: Apr. 4, 2010; Applicant: Water Gremlin Company; Mailed on Sep. 7, 2010.

International Search Report and Written Opinion; International Patent Application No. PCT/US2011/021571; Filed: Jan. 18, 2011; Applicant: Water Gremlin Company; Mailed on Mar. 21, 2011.

International Search Report and Written Opinion; International Patent Application No. PCT/US2011/028388 filed Mar. 14, 2011, Mailing Date: Jul. 26, 2011.

International Search Report and Written Opinion; International Patent Application No. PCT/US2011/028389 filed Mar. 14, 2011, Mailing Date: Aug. 25, 2011.

Lindberg Corporation. Hot Lines. Mar. 1993, vol. III, Issue 2, pp. 1-2, place of publication unknown. On U.S. Pat. No. 5,758,711.

Lindberg Corporation. Hot Lines. Significant Developments from the Engineered Products Group: Equipment News. Date unknown, Issue 3, 3 pages, place of publication unknown. On U.S. Pat. No. 5,758,711.

Lindberg Corporation. Press Release: Thixomolding Processes Establishes Production Benchmarks, 1993, 5 pages, Illinois.

Non-Final Office Action U.S. Appl. No. 13/008,673, Mailed on Jul. 18, 2013, 44 pages.

Non-Final Office Action U.S. Appl. No. 13/046,649, Mailed on Feb. 27, 2013, 35 pages.

Non-Final Office Action U.S. Appl. No. 13/539,159, Mailed on Apr. 3, 2013, 40 pages.

Non-Final Office Action U.S. Appl. No. 13/046,643, Mailed on Jul. 1, 2013, 22 pages.

Non-Final Office Action, U.S. Appl. No. 11/011,362, Mailed on Dec. 5, 2008, 7 pages.

Non-Final Office Action, U.S. Appl. No. 11/058,625, Mailed on Nov. 2, 2005, 5 pages.

Non-Final Office Action, U.S. Appl. No. 11/058,625, Mailed on Nov. 30, 2006, 4 pages.

Non-Final Office Action, U.S. Appl. No. 11/709,365, Mailed on Oct. 31, 2007, 5 pages.

Non-Final Office Action; U.S. Appl. No. 11/076,559; Mailed on Oct. 17, 2008, 6 pages.

(56) References Cited

OTHER PUBLICATIONS

Non-Final Office Action; U.S. Appl. No. 12/470,363; Mailed on Jul. 22, 2009, 10 pages.
Non-Final Office Action; U.S. Appl. No. 12/533,413; Mailed on Jan. 28, 2013, 13 pages.
Non-Final Office Action; U.S. Appl. No. 12/533,413; Mailed on Jun. 19, 2012, 10 pages.
Non-Final Office Action; U.S. Appl. No. 12/771,714, mailed Jun. 28, 2012, 11 pages.
Non-Final Office Action; U.S. Appl. No. 13/927,044; Mailed on Oct. 28, 2013; 12 pages.
Non-Final Office Action; U.S. Appl. No. 13/971,674; Mailed on Jan. 3, 2014; 9 pages.

BATTERY PARTS AND ASSOCIATED SYSTEMS AND METHODS

CROSS-REFERENCE TO RELATED APPLICATION(S)

This application is a Divisional of U.S. patent application Ser. No. 12/533,413, filed Jul. 31, 2009, now issued as U.S. Pat. No. 8,701,743, which is a Continuation-In-Part of U.S. patent application Ser. No. 11/011,362, filed Dec. 13, 2004 and entitled "BATTERY PART," which claims priority to U.S. Provisional Patent Application No. 60/533,924, filed Jan. 2, 2004 and entitled "BATTERY PART AND METHOD OF MAKING," and which is also a Continuation-In-Part of U.S. patent application Ser. No. 10/804,401 (now U.S. Pat. No. 7,338,539), filed Mar. 18, 2004 and entitled "DIE CAST BATTERY TERMINAL AND A METHOD OF MAKING," which also claims priority to U.S. Provisional Patent Application No. 60/533,924, filed Jan. 2, 2004 and entitled "BATTERY PART AND METHOD OF MAKING," each of the foregoing patents and patent applications is incorporated herein in its entirety by reference.

TECHNICAL FIELD

This invention relates generally to battery parts and, more specifically, to battery parts and a methods and systems for flaring or otherwise forming an acid ring on the battery part.

BACKGROUND

Battery parts such as battery terminals, which are typically cold formed or die cast, are normally secured to a container with a portion of the battery terminal located inside the container and a further portion located outside the container. The battery containers, which are typically plastic such as polyethylene, are molded around a set of acid rings that are located on the portion of the terminal that is located within the container. The acid rings provide an extended interface and consequently a tortuous path to inhibit or prevent electrolyte from escaping from the battery container. Because the acid must follow an extended interface to escape this type of sealing, with a set of concentric acid rings, is often referred to as a labyrinth seal.

Because the battery terminals are cast or cold formed the radially protruding acid rings are generally formed with either a rectangular cross sectional shape or a slight outward taper to facilitate removal of the battery terminals from the mold.

While battery terminals have a generally rectangular cross sectional shape are used extensively other shaped acid rings have been used in order to prevent the plastic container from shrinking away from the terminal and upsetting the interface between the battery part and the container which could cause leakage of electrolyte. Generally, these type of acid rings provide lateral engagement between the acid ring and the container.

For example, the 1971 United Kingdom patent specification GB 1236495 discloses a battery terminal wherein two acid ring are bent toward each other to provide a dovetail shaped gap that extends along the entire length of the acid ring so that it enables the two adjacent acid rings to form a dovetail joint with the battery container and thereby provide lateral engagement between the acid ring and the container.

The 1971 United Kingdom patent specification GB 1,245,255 discloses three acid rings that have been deformed to create a dovetail shaped gap between adjacent acid rings with the dovetail gap extending along the entire length of the acid ring to form two dove tail joints with the container and thereby provide lateral engagement between the acid ring and the container. In this embodiment the acid rings are compressed sufficiently to deform the acid rings so that the acid ring tapers inwardly along the entire length of the ring, that is from the circumferential edge of the acid ring to the base of the acid ring.

The 1981 Japanese patent JP56159054 discloses a further embodiment wherein the battery terminal acid rings are deformed along the entire length of the acid ring to form inclined projections on the acid rings that engage the cover to provide effective liquid tightness and thereby provide lateral engagement between the acid ring and the container.

The 1993 Hofmann German patent DE 4127956 A1 discloses a battery terminal wherein the ends of the acid rings have been rounded and the lower acid ring has been provided with a wedge shaped profile to increase the sealing effect with a container and thereby provide lateral engagement between the acid ring and the container.

The 1994 Hofmann German patent DE 4241393 C1 discloses a battery terminal wherein the ends of the acid rings have been rounded and a barb or undercut that forms a hook which is located on the back side of the acid ring. The "hook" on the back side of the deformed acid ring hooks into the plastic container i.e. to lateral restrain the container to prevent the plastic battery container material from shrinking away from the battery terminal. In addition, a further embodiment is disclosed wherein adjacent acid rings are of the same thickness but are angled away from each other in order to laterally restrain the container with respect to the acid rings.

The 1992 Hofmann European patent 0 601 268 B1 discloses a battery terminal wherein the ends of the acid rings either have a rounded end or a triangular shaped end with a barb or hook on the back side of the acid ring. This "hook" on the back side of the deformed acid ring hooks the plastic to prevent the plastic battery container material from shrinking away from the battery terminal by laterally restraining the container with respect to the acid rings.

The 1992 Hofmann European patent application 0 601 268 A1 also discloses the battery terminal wherein the ends of the acid rings either have a rounded end or a triangular shaped end with a barb or undercut or hook on the back sides of the acid ring. In addition, a further embodiment of an acid ring is disclosed wherein two adjacent acid rings, which are of the same thickness, are angled away from each other to laterally restraining the container with respect to the acid rings by forming a dovetail like joint.

The 1989 Hofmann German patent application DE 3942175A1 discloses a method of forming a battery terminal with acid rings by cold rolling the terminal to form the circumferential acid rings.

Speigelberg U.S. Pat. No. 6,644,084 describes a process of forming an acid ring with a hook by first deforming the battery terminal from a rectangular shaped acid ring to an arrowhead shaped acid ring. The transformation to the hook shape is obtained by rotating the battery terminal relative to a cold forming roller to deform an acid ring with a rectangular cross section into an acid ring having an undercut or overhang. The cold rolling process involves substantial deformation of the acid ring on the cast battery part in order to produce the hook for engaging the battery container.

While the prior art provides acid rings with rectangular shapes that are either bent or transformed into a different shape by cold rolling to form a lateral restraint between the battery container and the terminal. The lateral restraint is obtained by either forming a hook on the acid ring or forming a dovetail or dovetail like engagement between the battery container and the battery terminal.

In contrast to the prior art acid rings, where the shape of the acid ring is substantially altered, in the present invention one can cast a battery part with the acid ring having a bifurcated end separated by a circumferential grove or an end with a single annular tapered lip. The bifurcated end results in two outwardly extending annular lips on each acid ring.

The annular lips on each acid ring can be flared away from each other to produce a beveled surface or sealing bead along an annular outer portion of each of the annular lips which not only laterally restrains the container with respect to the terminal but also forms an enhanced sealing region between the container and the acid ring. In addition the circuitous path provided by the bifurcated acid rings can increase the resistance to electrolyte leakage by providing a more tortuous interface between the acid rings and the container.

A further feature of the invention is the flaring of the lips can be obtained by applying a radial compressive force to the bifurcated ends of the acid ring. Since only the bifurcated ends of the acid ring are flared it substantially eliminates problems that can occur with prior art cold farming deformation of a pressure cast battery terminal. That is, an interface between a die cast portion of battery terminal and a cold rolled portion of the battery terminal can lead to cracks or stress areas between the cast region and the cold formed region of the battery part, which can be subject to electrolyte leakage therethrough. By minimizing the interface one can minimize the opportunity for leakage.

Thus the flaring of the lips on the bifurcated acid ring of the present invention produces a back flare sealing region that extends circumferential around the terminal which not only enhances sealing but also restrains lateral engagement between the container and the acid rings and at the same time minimizing the occurrences of fractures or stress cracks in metal that has a portion of the original die cast shape altered by cold rolled deformation.

The present invention provides a battery part that eliminates the substantial deformation or acid ring transformation necessary to either form an under cut or overhang on the acid ring or to deform an acid ring along its entire length to form a dovetail engagement as shown in GB 1236495; GB 1,245, 255; JP 5619054 and EPO 06012681A1. In addition, the present invention further eliminates the need to mechanically deform the acid ring from a rectangular shape to an arrow head shaped acid ring or to an acid ring with a hook or an acid ring with a beveled surface that extends along the entire length of the acid ring as shown in EP006012681B1 and DE 4241393.

Thus, by flaring the lip or lips on the circumferential end of the acid ring one can form annular sealing regions, laterally restrain the container with respect to the acid ring, and inhibit electrolyte from escaping from the battery container with a more tortuous path. Not only does the present invention inhibit escape of electrolyte by providing a circumferential sealing ring it also make it easier to flow the plastic around the acid ring since the flared lip extends along only a portion of the acid ring. In addition, the present process minimizes stress produced in the battery part when a substantial part of a die cast battery terminal is subsequently transformed to a substantially different shape by cold rolling since the lips on the end of the acid ring can be flared instead of mechanically deformed into an entirely different shape.

SUMMARY

Briefly, embodiments of the disclosure include a battery part such as a battery terminal with the battery part having an inclined sealing region or sealing bead located on a lateral face of an acid ring with the sealing region increasing the resistance to leakage therepast as the corresponding battery container shrinks. Another embodiment of the disclosure includes a battery part with a bifurcated acid ring end and a beveled end face. The disclosure further includes a method of forming a battery terminal with an acid ring having a bifurcated end and a beveled face that permits one to use the battery terminal in an as is condition or in a flared condition wherein the lips on the bifurcated end of the acid ring can be flared to form a beveled sealing region that functions like an "O-ring" on the backside of the lip of the acid ring.

DETAILED DESCRIPTION

Figure 1:
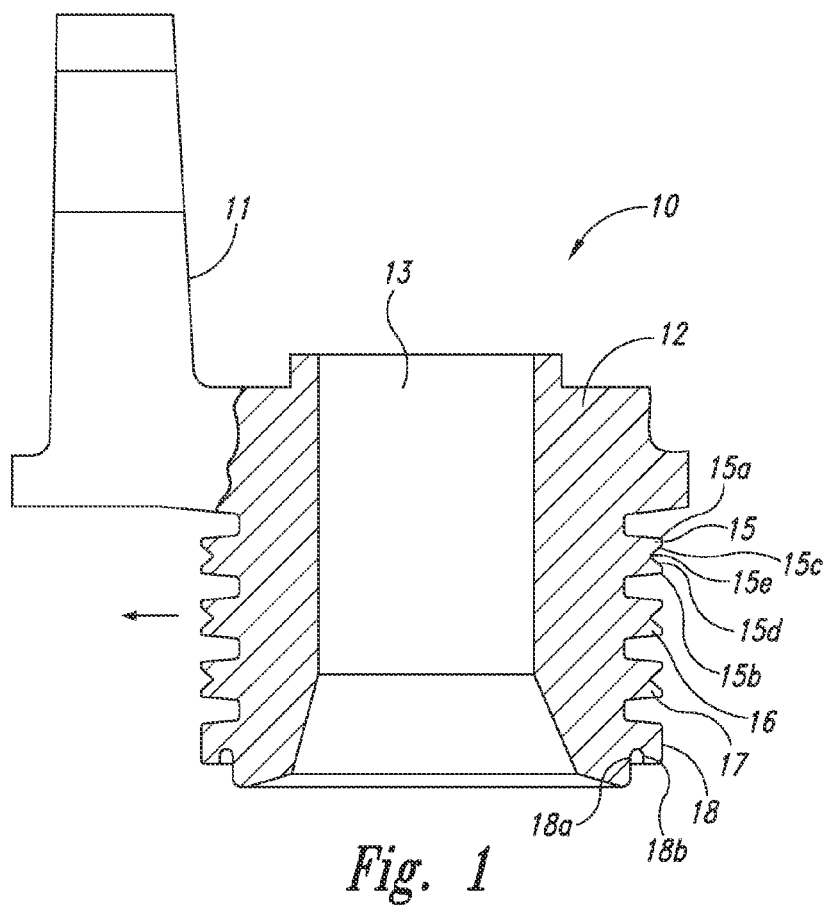
FIG. 1 is a partial cross sectional view of a battery terminal with bifurcated acid rings.

FIG. 1 shows a battery part 10 comprising a battery terminal having an upward extending lug 11 and a hollow base 12 having a central opening 13 therein. Located around the exterior of battery terminal 10 is a set of bifurcated annular acid rings 15, 16, 17, and 18 that have been formed by a die casting process. That is, a segmented mold (not shown) which radially surrounds the sides of battery part 10 during the casting process has been pulled radially away from the battery part 10 to release the battery part from the mold. Due to the configuration of the battery part and the need to pull the side mold parts radially or laterally away from the terminal the intermediate acid rings 15, 16 and 17 are oftentimes each provided with a slight tapered. Each of the acid rings 15, 16 and 17 have been cast with an annular V shaped groove located in the end of each of the acid rings. The placement of the groove in the end of acid ring generates a bifurcated circumferential end to the acid ring with each of the bifurcated ends including radially extending annular lips which are located along the opposite lateral faces of the acid rings 15, 16 and 17. Thus, a feature of the present invention is a battery terminal wherein the cast battery terminals comprising a bifurcated acid ring 15 with a die cast upper annular lip 15a and a die cast lower annular lip 15b. The end face of each of the acid rings are shown with an interior side surface or a bevel face 15c and interior side surface or a bevel face 15b that are joined at the root of the acid ring to form a V shaped annular groove 15e. Similarly, each of the bifurcated acid rings 16 and 17 have identical lips that form an apex at the root of the lips and a V shaped annular groove on the periphery of the annular acid ring.

In the embodiment shown in FIG. 1 the lower acid ring 18 is provide with an undercut 18a which can be formed by an end mold (not shown) that coacts with the side molds. That is, the end mold can be used to form the annular downward extending lip 18b since the end mold can be moved axially away from the end of the mold when the battery part is released from the mold.

Thus a feature of the present invention is the ability to cast a battery terminal wherein after the casting process has been completed at least one of the acid rings contains a lip or overhang 18b that can be used to seal the battery terminal to a battery container. Although an overhang 18 can be cast with the present process of forming bifurcated acid rings one may elect not to cast a terminal with an overhang and instead use only the flared bifurcated ends of the acid rings to maintain the sealing relationship between the container and the terminal.

Figure 2:
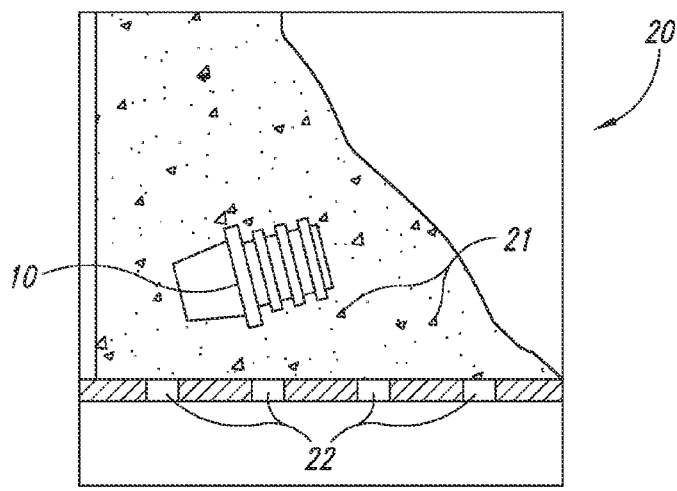
FIG. 2 is a partial cross sectional view of a chamber having a fluidized particles that impinge on a battery part therein.

FIG. 2 illustrates the battery terminal 10 located in a fluidized bed having particles 21 that impinge on the exterior surfaces or beveled end face of the acid rings 15, 16 and 17 of the battery terminal through the introduction of fluid through lower openings 22. The impingement of the particles, which are preferably harder than the battery part, provide a two-fold effect. The first effect is that the particles impinging the battery part can polish the exterior surface of the battery part. The second effect is that it has been found that the impingement of particles on the beveled end surfaces of the acid ring can causes the lips of annular acid rings to fold over or flare out and create a beveled sealing region or sealing bead much like an O-ring on the lateral face of the acid rings. Thus, a feature of the present invention is that one eliminates the need to form a "hook like" connection between the battery terminal and the battery container or to deform the entire acid ring into a dovetail.

Figure 3:
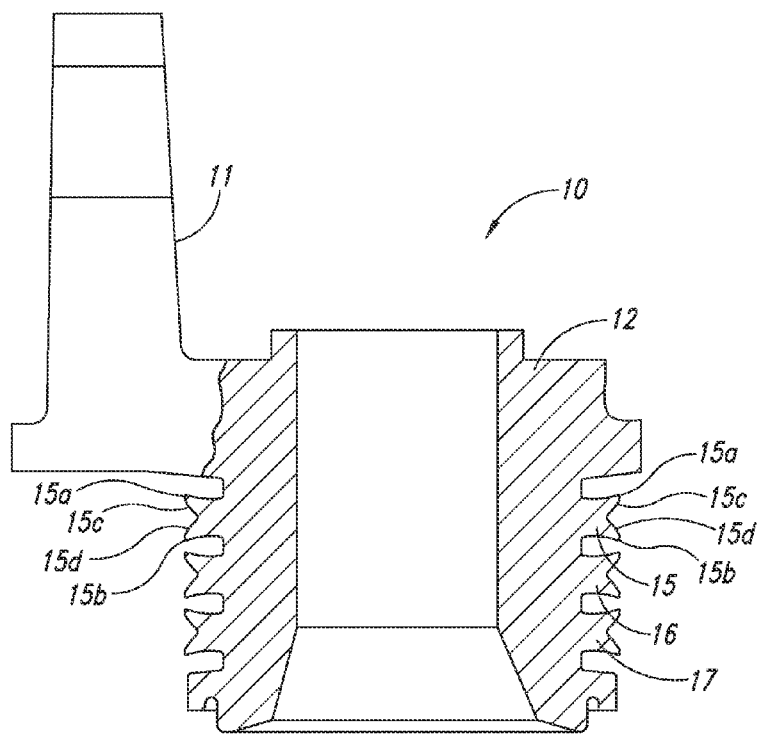
FIG. 3 is a partial cross sectional view of the battery terminal of FIG. 1 after being exposed to the fluidized media or particles as illustrated in FIG. 2.

A reference to FIG. 3 shows how battery part 10 appears after being subjected to impingement from fluidized particles. To illustrate the folding or flaring of the annular lip reference should be made to acid ring 15 which shows lip 15a curved upward and lip 15b curved downward. That is, the impingement of particles on the bevel surface 15c and 15d occurs with sufficient force so that the annular lips 15a and 15b are flared outward to thereby creating a sealing region on the backside thereof for sealing engaging and restraining a battery container without the need for forming a hook on the battery part. Since the angled surfaces 15c and 15d transmit a portion of the force in an axial direction the lip can be flared or folded outward through the radial impingement of particles on the angled surfaces 15c and 15d. As each of the bifurcated annular rings 16 and 17 have identical annular lips each of the bifurcated annular rings 16 and 17 produce a sealing region on the lateral face of the acid sealing rings for sealing engagement between container and terminal while laterally restraining a battery container with respect to the terminals without the use of a hook which could trap air therein during the formation of the container and consequently produce regions with enhanced risk of electrolyte leakage. However, if the lips are flared outward slightly to produce a sealing bead the trapped air can flow smoothly outward during the molding process and one need not be concerned with air being trapped in a "hook" on the backside of the acid ring.

While the battery part has been placed in a fluidized bed so that particles can be directed against the beveled side surface of the acid rings other methods of impinging particles against the surface such as in a tumbler where the battery part and harder media are allowed to contact the battery part as the media and the battery part are tumbled about can be used to deform the annular lips on the cast battery part. That is, in another flaring process the use of a deformable material such as a lead or lead alloy allows one can flare or bend the lips on the acid rings to the desired shape through contact of an article or particles with the angled side surfaces on the axially spaced circumferential acid rings.

Figure 4:
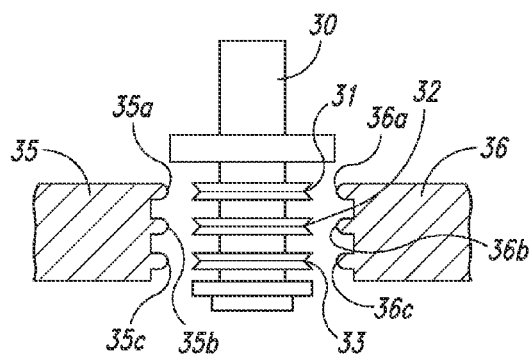
FIG. 4 is a partial side view showing radial peening members for folding over the ends of the bifurcated acid rings on a battery terminal.

FIG. 4 shows a side elevation view of a different system and method for folding or flaring the annular lips into a container engaging protrusion or sealing region on the terminal. In the embodiment shown the battery terminal 30 contains annular acid rings 31 with a V-shaped groove in the end face. A set of radially displaceable peening or flaring members 35 and 36 are positioned proximate the acid rings. In the embodiment shown the peening member 35 includes curved protrusions 35a, 35b and 35c which are located in the same plane as acid rings 31, 32 and 32. Similarly, peening member 36 includes peening protrusions 36a, 36b and 36c that are located in the same plane as acid rings 31, 32 and 33. The radial inward displacement of member 35 and 36 brings the peening protrusions into engagement with the V-shaped grooves in each of the acid rings which causes the annular lips of the acid rings to be folded outward or flared outward as illustrated in FIG. 3 to thereby form a sealing region or a rigid sealing ring on the backside of the acid ring.

Figure 5:
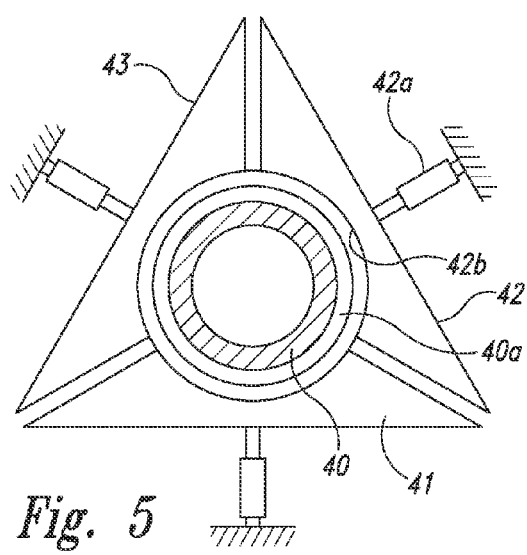
FIG. 5 is a top view of three radial peening members located around the periphery of a battery terminal with bifurcated acid rings.

FIG. 5 shows a bottom view of how a multiple part radial peening member can peen or compress the bifurcated acid rings so each of the acid rings have a lip or protrusion for engaging a container. In the embodiment shown, a first arcuate shaped peening member 42 which is radially positionable through a hydraulic cylinder 42a includes a peening surface 42b that is an alignment with the acid ring 40a. Similarly, positioned around terminal 40 are peening members 41 and 43 that cooperate to form a closed annular peening member that engages and folds or flares the lips on the annular acid ring backward into the hooking or container engaging protrusion illustrated in FIG. 3 by radial inward displacement of the peening members into the angled side surfaces of the annular lips on the acid ring. Thus FIG. 5 illustrates one method of forming sealing regions on the bifurcated acid rings by directing a member into the V-shaped grooves in the end faces of the bifurcated acid rings.

While the invention has been described in regard to die casting the battery terminal could also be formed from other casting methods or through cold forming.

Figure 6:
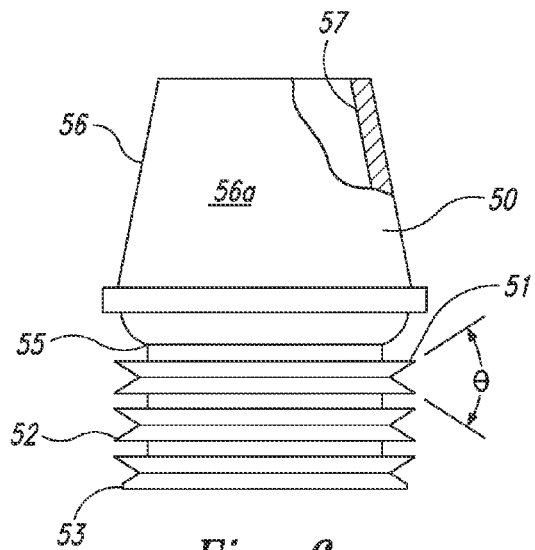
FIG. 6 is a partial side view of a battery terminal having a set of acid rings with a valley or groove in the end face of the acid rings.

FIG. 6 shows a preferred embodiment of the invention comprising a battery part 50 such as a battery terminal with a set of spaced bifurcated acid rings 51, 52 and 53. The bifurcated acid rings extend around the peripheral region of the battery part and can have any number of shapes including circular, hexagonal or the like. Although one acid ring can be sufficient for engagement with a battery container the battery part 50 generally includes at least three lateral spaced acid rings that extend radially outward from the base 55 of battery part 50.

Battery part 50 includes a connector lug 56 having an exterior surface 56a for forming an electrical connection to an external device. In the embodiment shown the battery terminal 50 includes a hollow central opening 57 to permit one to pour molten metal therein to form an electrical connection to an internal battery components such as a battery plate or the like.

Figure 7:
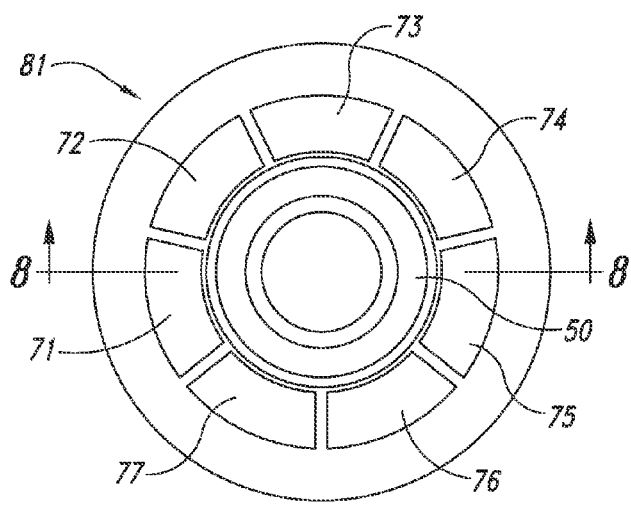
FIG. 7 is a top view of the battery terminal of FIG. 8 in a collet.
Figure 7A:
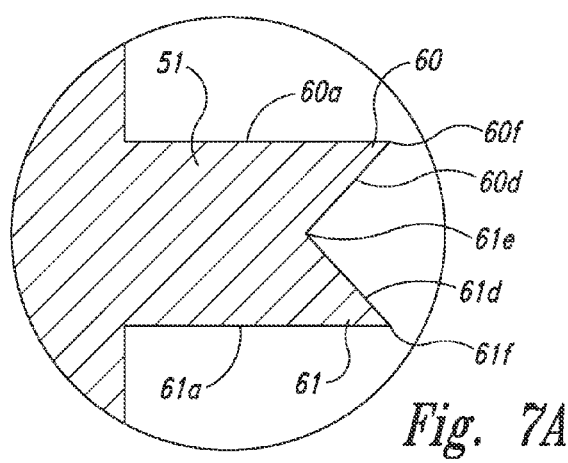
FIG. 7A is a sectional side view showing the beveled surfaces and the lateral surface on an acid ring with bifurcated lips.

FIG. 7A shows an isolated view of a portion of bifurcated acid ring 51 to reveal in detail the lip 60 with a first face or lateral face 60a on one side and a second face, namely a beveled end face 60d on the other side of lip 60 with the lateral face 60a and the beveled end face 60d forming an included angle of less than 90 degrees therebetween. Similarly, a second lip 61 includes a first face or lateral face 61a on one side and a second face, namely, a beveled end face 61d on the opposite side with the lateral face 61a and the beveled end face 61d forming an included angle of less than 90 degrees therebetween. In addition, the beveled end face 60d intersects beveled end face 61d at an apex 61e to form a valley or V-shaped groove between the lip 60 on one face of the acid ring and the lip 61 on the opposite face of the acid ring 51.

Figure 7B:
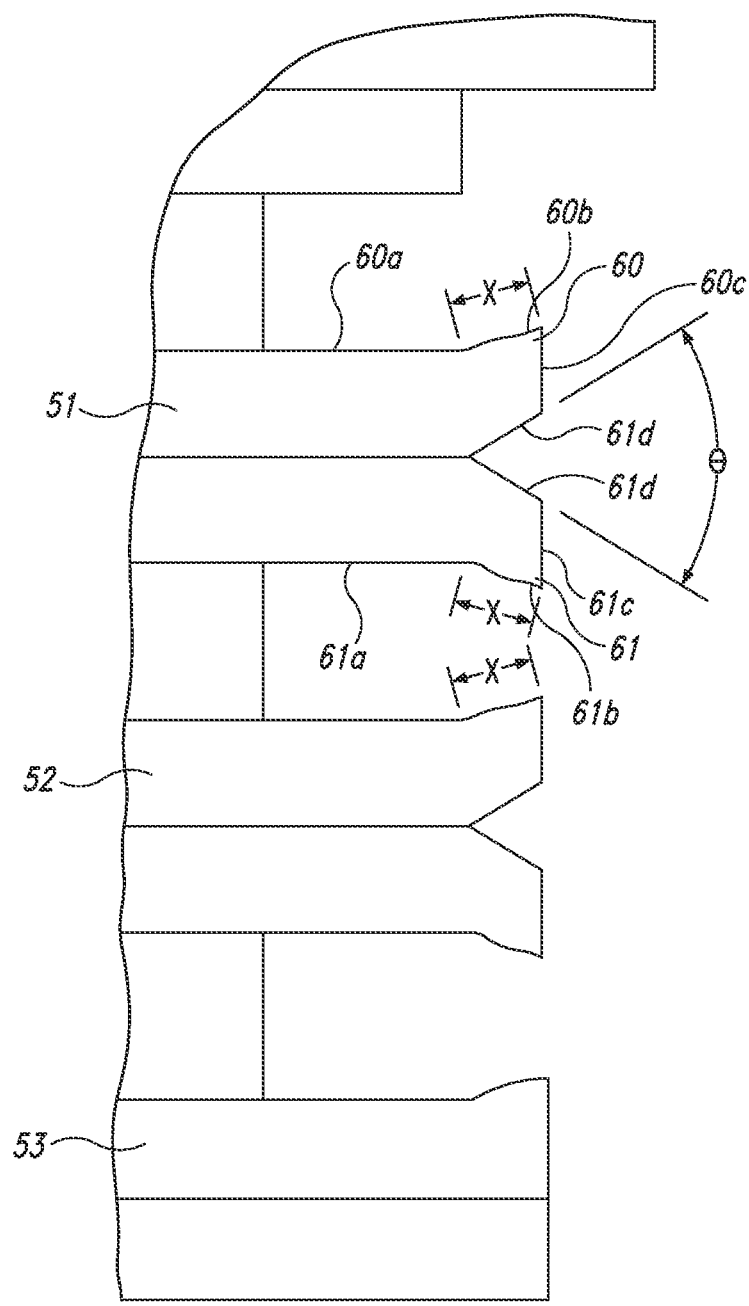
FIG. 7B is an enlarged view of a portion of the acid rings to reveal the beveled sealing surfaces on the acid ring.

FIG. 7B shows acid rings 51, 52 and 52 in a partial view in FIG. 7A with the lips in a flared condition to form a lateral sealing region or sealing bead on the lateral faces of the acid rings to thereby enhance the sealing of a battery container to the terminal. The beveled surface 60d of the first lip 60 and the beveled surface 61d of second lip 61 are located at approximately a ninety degree angle to each other although the angle can vary depending on the selection of the angle of the beveled surface for each lip. In the embodiments shown the lips 60 and 61 which were previously in an unflared condition (FIG. 7A) and an apex 60f and 61 have been transformed to a flared condition. The lip 60 has a an extended flat surface 60c and lip 61 has an extended flat surface 61c.

While FIG. 7A illustrates the acid ring in the unflared condition, FIG. 7B shows the acid rings in a flared condition. In the flared condition the lips on the bifurcated acid rings have been flared laterally to form a sealing region or sealing bead along the lateral faces of the acid rings.

FIG. 7A shows acid ring 51 in the as cast condition revealing lip 60 and lip 61 in an a straight or unflared condition. In the embodiments shown bifurcated acid ring 51 has a first lateral face 60a and a second lateral face 61 located in a substantially parallel relation ship to each other.

FIG. 7B shows bifurcated acid ring 51 in the flared condition. In the flared condition the bifurcated acid ring 51 includes a first circumferential end face 60c and a second circumferential end face 61c separated by a first circumferential beveled end face 60d and a second circumferential beveled end face 61d. In the flared condition a first circumferential sealing region or sealing bead 60b extends around the outer portion of lateral face 60a and a second circumferential sealing region or sealing bead 61b extends around the outer portion of lateral surface 61a. As can be seen in FIG. 7B the lip 60c located on the acid ring 51 and the lip 61 located on acid ring 51 have been flared upward to form the respective sealing regions 60b and 61b. The sealing regions have a lateral length denoted by x and extend partially along the lateral faces of the acid ring. Each of the sealing regions extend circumferentially around the battery terminal to provide a 360 degree sealing barrier between the container and the battery container.

Figure 8:
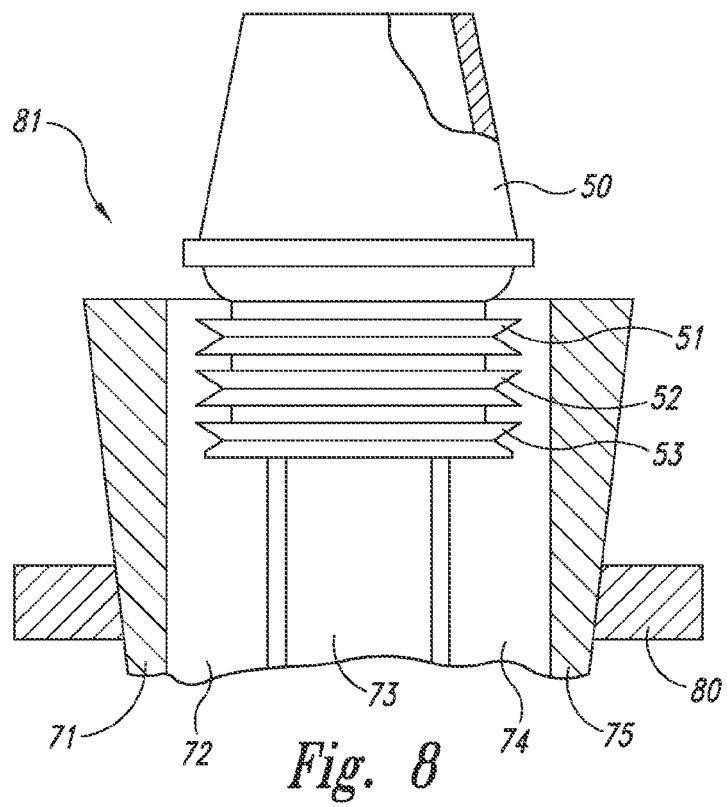
FIG. 8 is a partial side view of the battery terminal of FIG. 6 in a collet in an expanded condition.

In order to appreciate the transformation of the battery terminal with a bifurcated acid ring into a battery terminal with cantilevered sealing regions reference should be made to FIGS. 7 and 8 which shows a collet 81 in top view. FIG. 8 shows a section view the battery terminal 50 positioned between a set of cantilever mounted splines 71, 72, 73, 74 and 75 on the collet 81. FIGS. 7-10 illustrate a battery terminal placed in collet 81 and the collet collapsed to radially compress the lips on the acid ring to form a sealing bead on the lateral surface of the bead.

FIG. 7 shows a top view of the battery terminal 50 centrally positioned between the splines 71-77 that are cantilevered held in a base member (not shown). A compression collar 80 extends around each of the splines so that when the collar is forced upward the splines are brought radially inward to flare the lips on acid rings 51, 52 and 53.

FIG. 8 shows a section view of collet 81 surrounding battery terminal 50 with the splines 71, 72, 73 and 74 in a spaced condition about the bifurcated acid rings 51, 52 and 53. If desired a mandrel (not shown) can be inserted into battery terminal 50 to hold the battery terminal in position.

Figure 9:
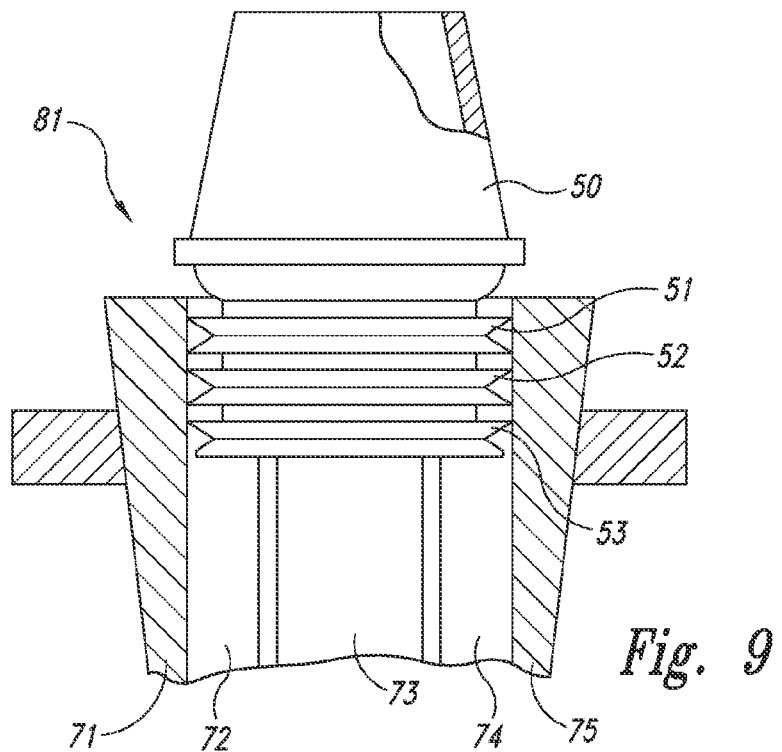
FIG. 9 is a partial side of the battery terminal and collet when the collet is partially contracted.

FIG. 9 shows the initial step in the formation of the sealing regions on the bifurcated acid rings 51, 52 and 53. In this condition the splines 71-75 have been brought into contact with the lips on the bifurcated acid rings 51, 52 and 53 while the acid rings are free to self center in the collet.

Figure 10:
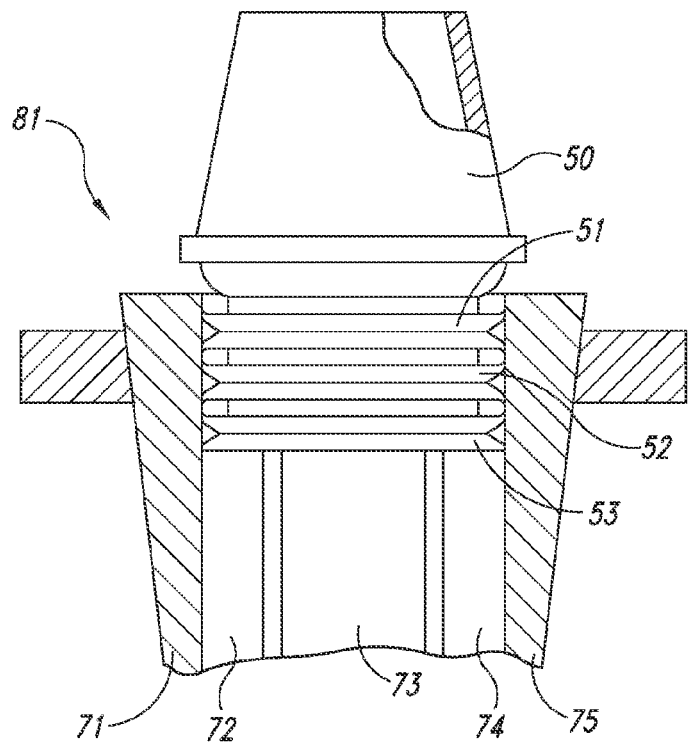
FIG. 10 is a partial side view of the battery terminal of FIG. 6 when the collet is in a contracted condition.

FIG. 10 shows the compression step wherein the splines 71-75 have been squeezed radially inward to flare the lips on acid rings 51, 52 and 53 sufficient to form a sealing bead on the lateral surface of each of the lips on the acid rings but insufficient to form the lips into a hook. That is the deformation, which is shown in greater detail in FIG. 7B, produces an inclined sealing region or sealing bead that extends along a portion of the backside of the flared lip of the acid ring. In the embodiment shown the radius of curvature of the collet and the radius of curvature of the acid rings are substantially equal so as to produce a uniform flaring of the lip.

Figure 11:
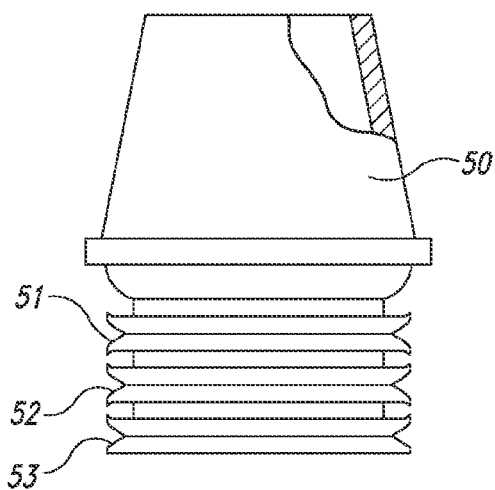
FIG. 11 is a partial side view of the battery terminal of FIG. 6 with the acid rings having been deformed by the collet.

FIG. 11 shows terminal 50 after compression by collet 81. As can be seen in FIG. 11 each of the lips on the acid rings 51, 52 and 53 have been flared to create the sealing regions illustrated in FIG. 7B. In contrast to the deformation of the rectangular shaped acid rings as shown in the prior art the compression of the bifurcated acid ring involves only a slight deflecting of the lips to create the sealing bead thus minimizing the stress lines that can be caused by the junction between a cold forming portion on a die cast battery terminal.

Figure 12:
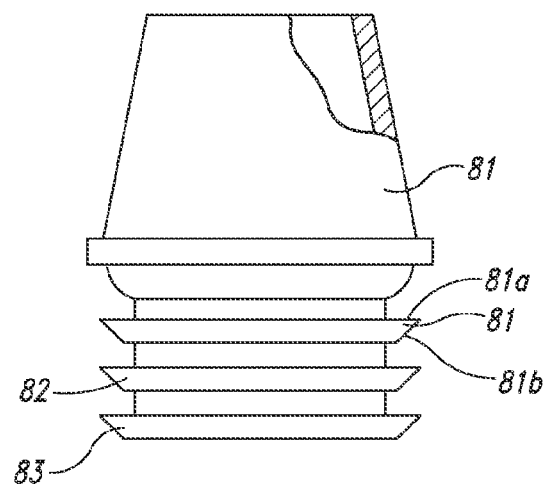
FIG. 12 is side view of an alternate embodiment wherein the acid ring is formed with a single lip on each acid ring.

FIG. 12 is side view of an alternate embodiment of a battery part 80 wherein the acid rings 81, 82 and 83 are formed with a single lip on each acid ring. That is acid ring 81 has a lateral surface 81a and a beveled surface 81b that form an angle of less than 90 degrees and preferably 45 degrees of less so as to form a lip that can be flared upward sufficiently to form a sealing bead on the lateral surface 81. In this embodiment the radial compression with the collet will form a top beveled sealing region on each lip to laterally restrain the container and simultaneously form an effective seal that inhibits the loss of electrolyte therepast.

Figure 13:
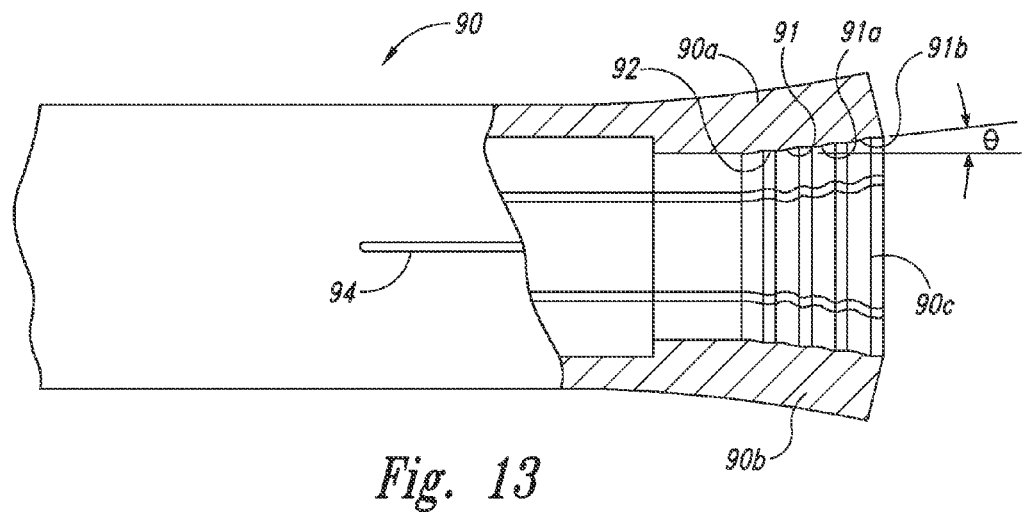
FIG. 13 shows a tapered collet for deformed the battery terminal.

FIG. 13 shows a collet 90 having a base with cantilevered sections 90b, 90a and 90c. Located on an inside face of the cantilevered collet sections are a set of annular ridges 91, 91a and 91b. An annular ridge 91 is adjacent a recess 92 as are the other ridges 91a and 91b also proximate a recess. In the embodiment shown the collet makes an angle 0 with a line parallel to a central axis of the collet. The purpose of the angle in the collet face is to allow one to form acid rings on a battery terminal having a tapered base. The spacing of each of the ridges on collet 90 are such that the ridges align with the V shaped recess in the bifurcated acid ring as illustrated in FIG. 4.

Figure 14:
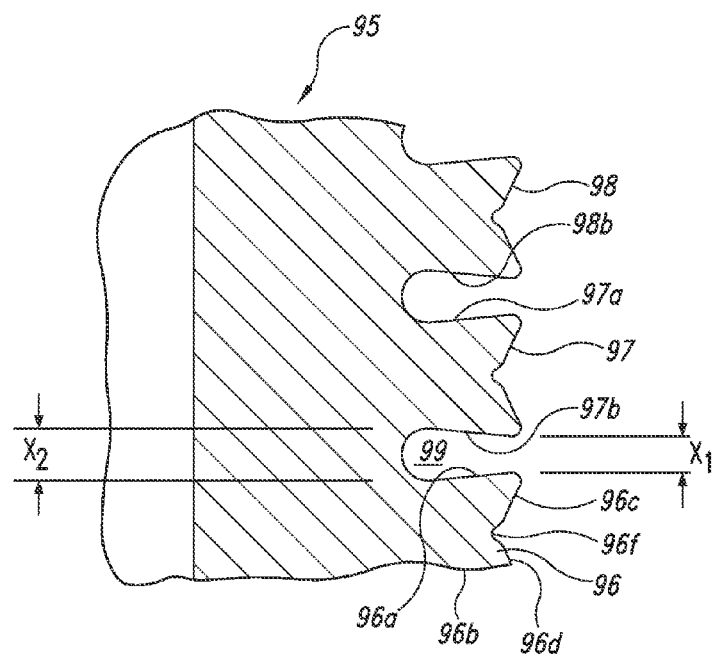
FIG. 14 shows a partial cross section view of a set of acid rings that have been deformed by the collet of FIG. 13.

FIG. 14 shows a partial sectional view of a battery terminal 95 wherein the collet 90 of FIG. 13 has been used to compress the bifurcated acid rings 96, 97 and 98. Each of the bifurcated acid rings have been radially compressed to deform the acid rings so as to produce a tear drop shaped recess 99 between adjacent acid rings wherein the lower part of the recess has a width $x_2$ that is larger than the entry region width $x_1$ to the recess to thereby form a retaining pocket to received the molten material used to form the container around the battery terminal. As shown in FIG. 14 the bifurcated acid ring 96 has an upper curved face 96c and a lower curved face 96d on opposite side of the undeformed portion 96f of the bifurcated acid ring 96 as a result of the acid ring having been deformed radially inward by collet 90. When each of the acid rings are subject to a squeezing by collet 90 the compression results in a smoothly curved surface 96a on the top side of acid ring 96 and a smoothly curved surface 97b on the bottom side of acid ring 97 that coact to form a tear drop shaped recess 99 for locking a battery container thereto. Similarly, the acid ring 98 has been deformed and the lower curved surface 97b coacts with upper curved surface 96a to form a further tear drop shaped pocket therebetween that can trap the molten plastic therein and assist in forming a leakproof seal. As can be seen in FIG. 14 each of the acid rings converges from an exterior portion of the acid ring to an internal portion of the acid ring. For example, surface 96c and 96b of acid ring 96 smoothly curve from the outer most portion or entry region to the recess to the inner most point or the bottom of the recess.

While the invention has been shown with circular battery terminals the invention can also be used with battery terminals that are other than circular such as oblong. In those instance a multiple part die as opposed to a collet can be used to deform the bifurcated acid rings into a condition where a retaining pocket is formed between.

Figure 15A:
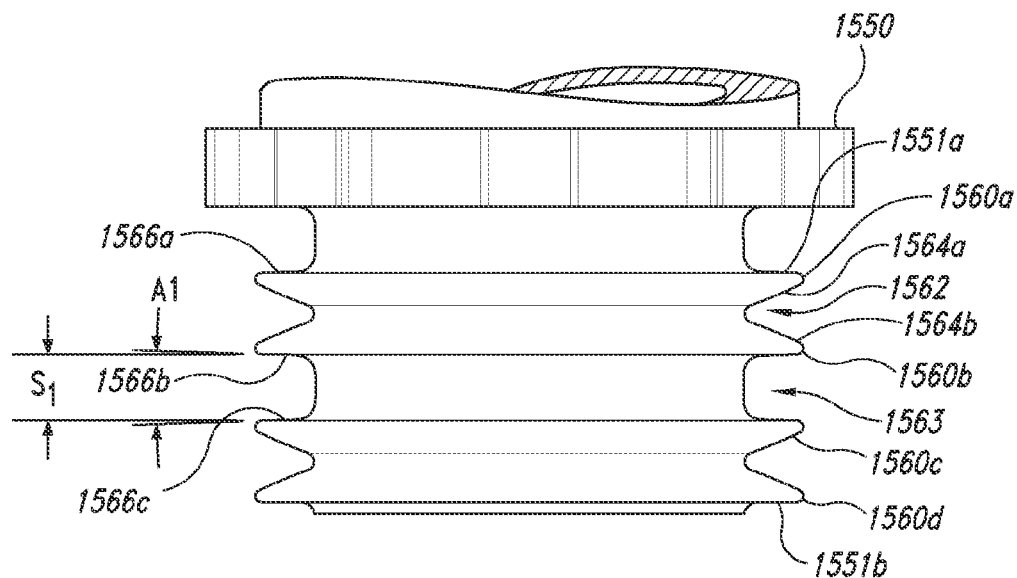
FIG. 15A is an enlarged view of a portion of a battery part illustrating various aspects of bifurcated acid rings configured in accordance with an embodiment of the present disclosure.
Figure 15B:
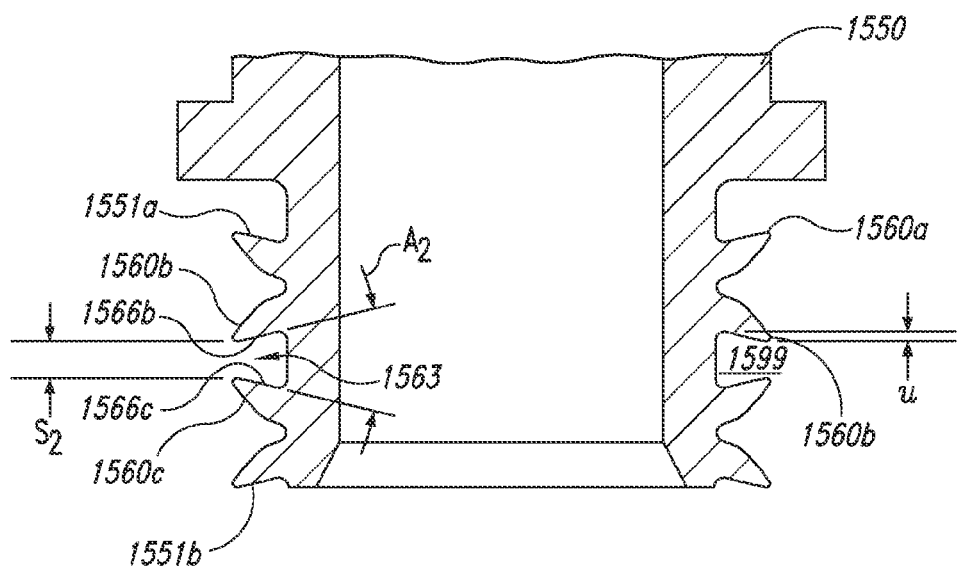
FIG. 15B is an enlarged cross-sectional view of the battery part of FIG. 15A after the bifurcated acid rings have been deformed in accordance with an embodiment of the disclosure.

FIG. 15A is an enlarged side view of a portion of a battery part, such as a battery terminal 1550, illustrating a plurality of acid rings 1551 (identified individually as a first acid ring 1551a and a second acid ring 1551b) configured in accordance with an embodiment of the disclosure. FIG. 15B is an enlarged cross-sectional view of the battery terminal 1550 after the acid rings 1551 have been deformed in accordance with an embodiment of the disclosure. Many features of the battery terminal 1550 are at least generally similar in structure and function to corresponding features of the battery parts 10, 30, 50, 80, and/or 95 described in detail above.

Referring first to FIG. 15A, in the illustrated embodiment each of the acid rings 1551 is a bifurcated acid ring. The first acid ring 1551a, for example, includes a first annular lip 1560a spaced apart from a second annular lip 1560b by a V-shaped groove 1562 therebetween. The first lip 1560a includes a first lateral surface 1566a and a first end face or beveled surface 1564a. In the illustrated embodiment, the first beveled surface 1564a forms an acute angle with respect to the first lateral surface 1566a. The second lip 1560b similarly includes a second lateral surface 1566b and a second beveled surface 1564b. The opposing beveled surfaces 1564 define the V-shaped groove 1562.

The second lateral surface 1566b of the first acid ring 1551a is spaced apart from a third lateral surface 1566c of the second acid ring 1551b by a distance $S_1$ that defines a gap 1563 therebetween. In the illustrated embodiment, the distance $S_1$ can be from about 0.04 inch to about 0.2 inch, or about 0.089 inch. Moreover, in the illustrated embodiment the second lateral surface 1566b can extend outwardly from the battery terminal 1550 at a slight angle relative to the third lateral surface 1566c so that the opposing lateral surfaces 1566b and 1566c define a slightly diverging angle $A_1$ (e.g., a "draft" angle) therebetween. For example, in the illustrated embodiment the angle $A_1$ can be from about zero degrees to about six degrees, or about four degrees. The angle $A_1$ can facilitate removal of the die from the battery terminal 1550 (or vice verse) during a casting process. As discussed in greater detail below, after the acid rings 1551 have been formed as shown in FIG. 15A, the lips 1560 (e.g., the first lip 1560a and the second lip 1560b) can be flared outwardly from each other or otherwise deformed to produce an undercut region 1599 (FIG. 15B) between adjacent acid rings 1551.

Figures 16A, 16B:
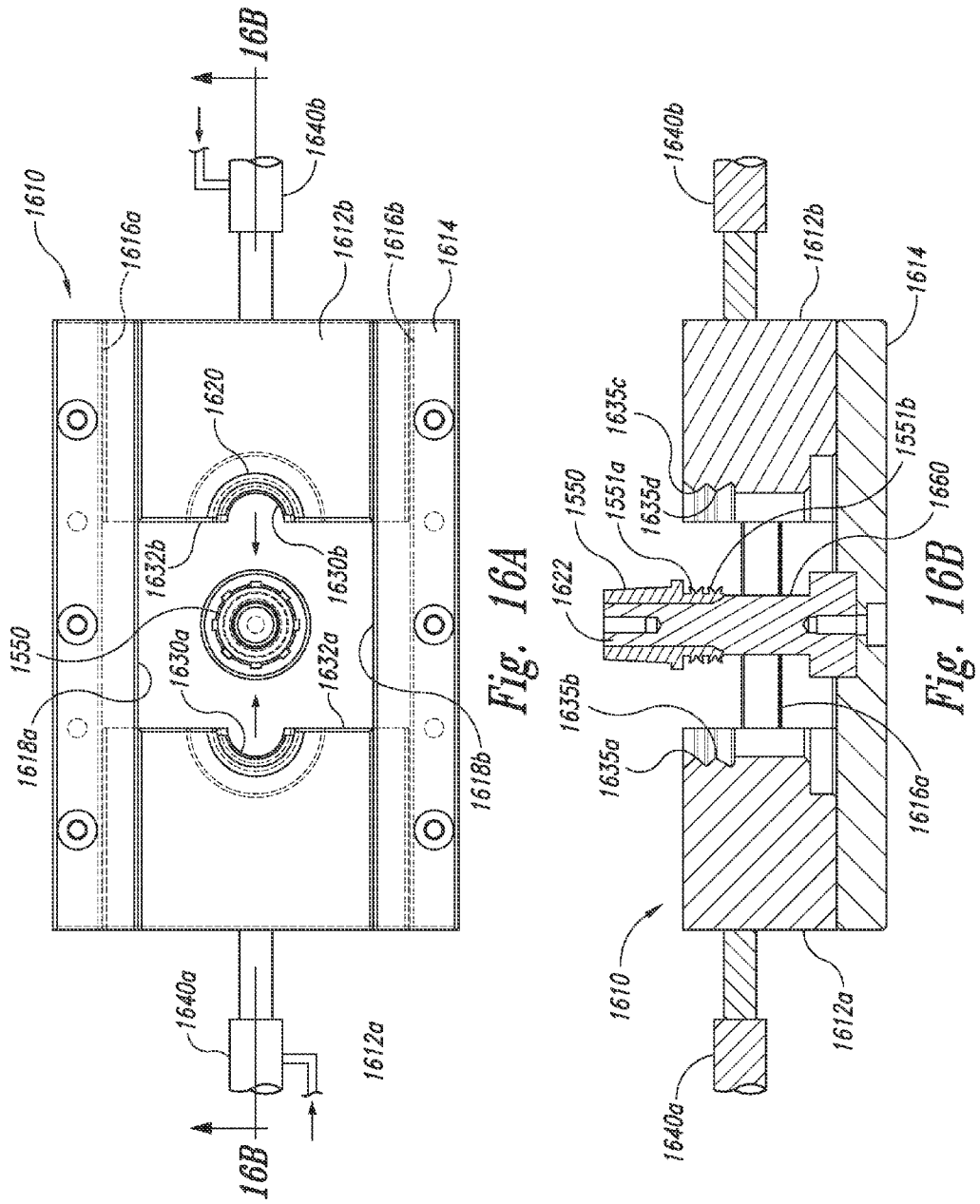
FIG. 16A is a top view of an acid ring forming assembly configured in accordance with an embodiment of the disclosure in an open configuration.
FIG. 16B is a cross-sectional side view of the open acid ring forming assembly taken along line 16B-16B in FIG. 16A.

FIG. 16A is a top view of an acid ring forming assembly 1610 configured in accordance with an embodiment of the disclosure for compressing, folding, flaring, peening and/or otherwise forming acid rings (e.g., the acid rings 1551) and/or other features (e.g., other sealing features) on battery terminals (e.g., the battery terminal 1550) and/or other battery parts. FIG. 16B is a cross-sectional side view of the forming assembly 1610 taken along line 16B-16B in FIG. 16A. Referring to FIGS. 16A and 16B together, the forming assembly 1610 includes a first-forming member 1612a and a cooperating second-forming member 1612b movably coupled to a tool base 1614. In the illustrated embodiment, each of the forming members 1612 is configured to slide back and forth along a longitudinal axis 1620 in guide tracks 1616 (identified individually as a first guide track 1616a and a second guide track 1616b) formed in adjacent sidewalls 1618 of the base 1614.

In another aspect of this embodiment, the forming assembly 1610 further includes a part support 1660 extending upwardly from a central portion of the base 1614. In the illustrated embodiment, the part support 1660 includes a peg having a distal end portion 1662 configured to removably receive the battery terminal 1550. More particularly, the distal end portion 1662 includes a cylindrical shaft portion or projection that extends through a central opening in the battery terminal 1550 to firmly support the battery terminal 1550 during the acid ring forming process described in more detail below. In the illustrated embodiment, the various components of the forming assembly 1610 described above (e.g., the forming members 1612, the base 1614, and the part support 1660) can be machined, cast, or otherwise formed from steel, aluminum, iron, and/or another suitable materials (e.g., other non-metallic materials including ceramics, composites, etc.)

known in the art for having sufficient strength, hardness, and/or other desirable characteristics.

Each of the forming members 1612 includes a corresponding forming portion 1630 (identified individually as a first-forming portion 1630a and a second-forming portion 1630b) having one or more protrusions 1635 (identified individually as protrusion 1635a-d) extending laterally along an interior surface thereof in lateral and vertical alignment with the corresponding acid rings 1551 on the battery terminal 1550. In the illustrated embodiment, each of the forming portions 1630 defines a semicircular recess configured to receive a portion (e.g., a half) of the battery terminal 1550 when the forming members 1612 move inwardly from the open position shown in FIGS. 16A and 16B to the closed position discussed below with reference to FIGS. 16C and 16D.

A first driver 1640a can be operably coupled to the first-forming member 1612a and a second driver 1640b can be operably coupled to the second-forming member 1612b. In the illustrated embodiment, the drivers 1640 can include hydraulic devices (e.g., pressurized hydraulic cylinders) that can be activated to drive the respective forming member 1612 toward the closed position to compress the battery terminal 1550 between the opposing forming portions 1630. In other embodiments, pneumatic, electro-mechanical, and/or manual devices can be used to drive the forming members 1612 against the battery terminal 1550 and then retract the forming members 1612 away from the battery terminal 1550. It is contemplated that in certain embodiments only one of the forming members 1612 (and possibly the part support 1660) may be movable during the forming process, while the other forming member 1612 remains stationary or at least approximately stationary.

Figure 16C:
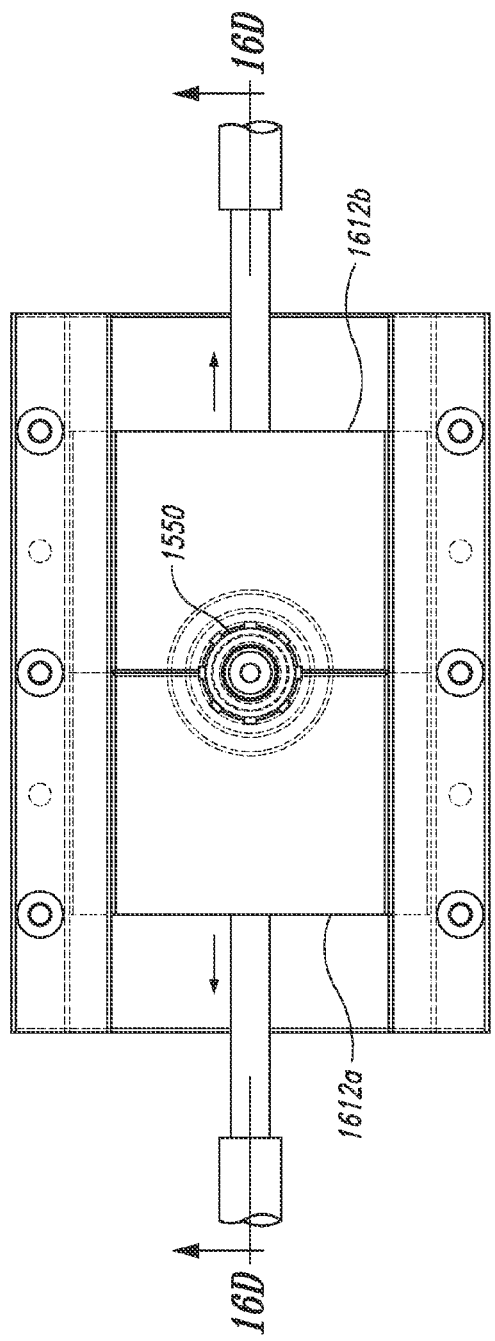
FIG. 16C is a top view of the acid ring forming assembly of FIGS. 16A and 16B in a closed configuration.
Figure 16D:
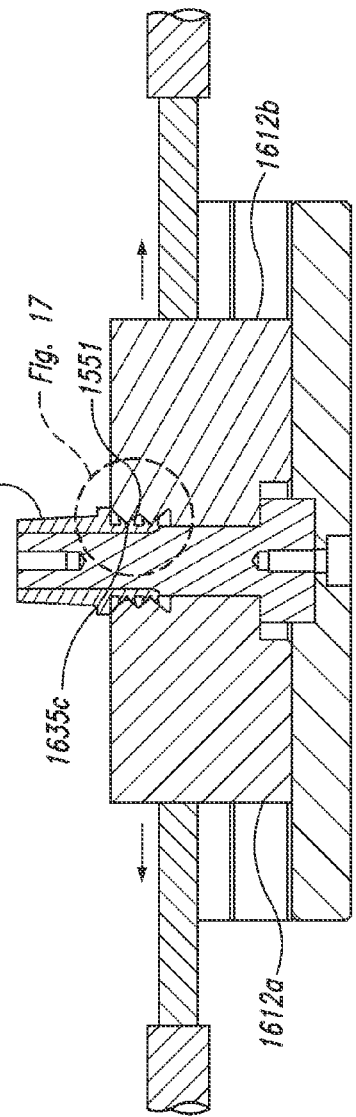
FIG. 16D is a cross-sectional side view of the closed acid ring forming assembly taken along line 16D-16D in FIG. 16C.

FIGS. 16A and 16B illustrate the forming assembly in an open position with the battery terminal 1550 temporarily placed on the part support 1660 for deforming the acid rings 1551. To form the acid rings 1551, the drivers 1640 simultaneously drive the opposing forming members 1612 toward each other until the protrusions 1635 on the forming portions 1630 impact the acid rings 1551 as shown in FIGS. 16C and 16D. After impact, the drivers 1640 can retract the forming members 1612 so that the formed battery terminal 1550 can be removed from the part support 1660 and replaced with another terminal ready for forming. Alternatively, the battery terminal 1550 can be struck multiple times to form the acid rings 1551 to the desired shape in stages.

Figure 17:
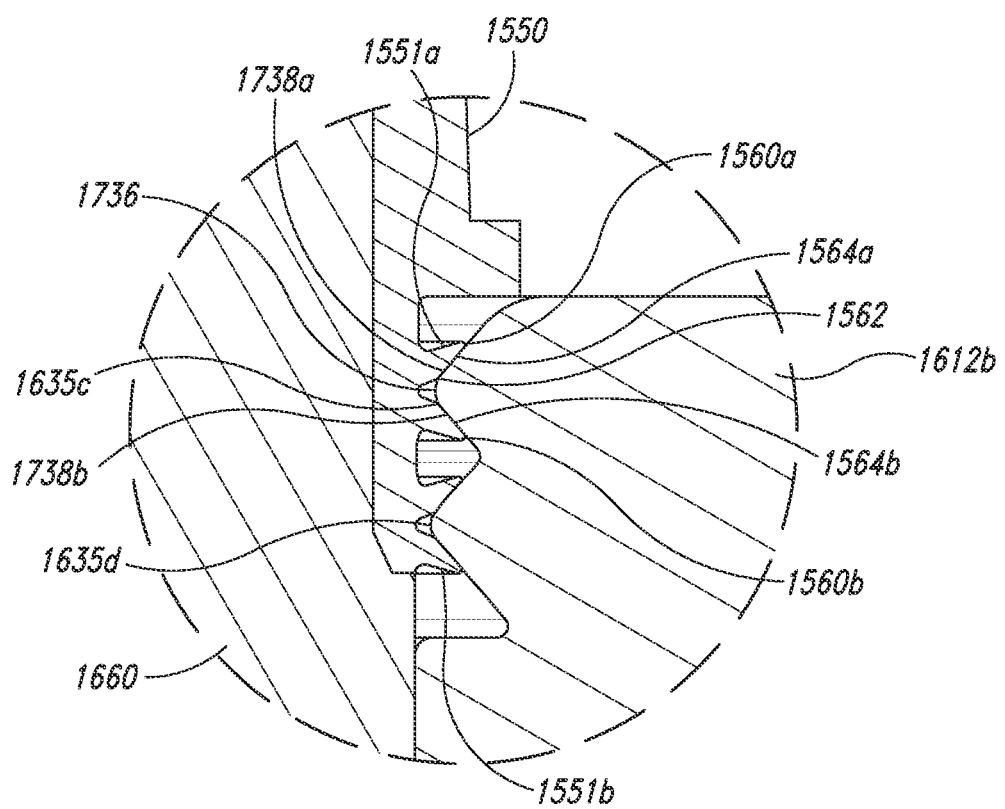
FIG. 17 is an enlarged cross-sectional side view taken from FIG. 16D illustrating how protrusions on the acid ring forming assembly strike acid rings on a battery part, in accordance with an embodiment of the disclosure.

FIG. 17 is an enlarged cross-sectional side view taken from FIG. 16D illustrating how the protrusions 1635 on the forming member 1612b deform the acid rings 1551 in accordance with an embodiment of the disclosure. As this view illustrates, each of the protrusions 1635 of the illustrated embodiment is at least approximately wedge or V-shaped and includes a vertex or apex 1736 with adjacent side surfaces 1738 (identified individually as a first side surface 1738a and a second side surface 1738b). Accordingly, when the forming portion 1630b is driven against the base of the battery terminal 1550, the apex 1736 of the protrusion 1635c, for example, drives into the V-shaped groove 1562 between the first lip 1560a and the second lip 1560b of the acid ring 1551a. More particularly, the first side surface 1738a of the protrusion 1635c presses against the first beveled end face 1564a of the first lip 1560a, and the second side surface 1738b presses against the second beveled end face 1564b of the second lip 1560b. As the protrusion 1635c presses inwardly, it flares the lips 1560a, b outwardly and away from each other as shown in FIG. 17. After forming, the forming members 1612 are pulled back from the battery terminal 1550, and the battery terminal 1550 is lifted off of the part support 1660.

Returning now to FIG. 15B, this Figure illustrates the acid rings 1551 after crimping or flaring using the systems and methods described above. As this view illustrates, the gap 1563 between the adjacent acid rings 1551a and 1551b has now closed to a distance $S_2$ which is less than the original distance $S_1$ (FIG. 15A). For example, in the illustrated embodiment the distance $S_2$ can be from about 0.02 inch to about 0.08 inch, or about 0.052 inch. Flaring the acid ring lips 1560 outwardly in this manner causes the opposing lateral surfaces 1566b and 1566c to define a converging angle $A_2$ therebetween. In the illustrated embodiment, the angle $A_2$ can be from about 15 degrees to about 35 degrees, or about 25.6 degrees. Moreover, the outward flare of the acid ring lips 1560 creates an undercut U beneath each lip 1560 of from about 0.008 inch to about 0.02 inch, or about 0.013 inch. The undercut acid ring lips 1560 coact to form an undercut region 1599 (e.g., an inwardly opening region) that is at least generally similar in structure and function to the teardrop shaped recess 99 described above with reference to FIG. 14. More specifically, the undercut region 1599 creates a pocket between the adjacent acid rings 1551 that can trap molten battery container plastic therein and assist in forming a leak-proof seal that locks the battery container thereto.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A method of making a battery part, the method comprising:
    casting a battery part having an annular acid ring extending around an exterior portion thereof, wherein the acid ring includes a first lip spaced apart from a second lip;
    positioning the battery part between a first forming member and a second forming member;
    driving the first forming member in a first axial direction against a first portion of the acid ring; and
    while driving the first forming member toward the first portion of the acid ring, driving the second forming member in a second axial direction opposite the first axial direction against a second portion of the acid ring opposite the first portion of the acid ring to shape the acid ring, wherein driving the first forming member in the first axial direction and the second forming member in the second axial direction includes flaring the first and second lips outwardly and away from each other.

2. The method of claim 1 wherein the first lip and the second lip each include a corresponding side surface and an end surface, wherein the individual end surfaces form an acute angle relative to the individual side surface, and wherein driving the first and second forming members against the battery part includes driving the first and second forming members against the corresponding end surfaces of the first lip and the second lip to flare the first lip and the second lip.

3. The method of claim 1 wherein the first lip is spaced apart from the second lip by a V-shaped groove therebetween, and wherein driving the first and second forming members against the battery part further includes driving first and second wedge-shaped protrusions into the V-shaped groove to flare the first and second lips apart from each other.

4. A method of making a battery part, the method comprising:
   casting a battery part having an annular first acid ring extending around an exterior portion thereof;
   casting a second acid ring spaced apart from the first acid ring;
   positioning the battery part between a first forming member and a second forming member;
   driving the first forming member in a first axial direction against a first portion of the first acid ring; and
   while driving the first forming member toward the first portion of the first acid ring, driving the second forming member in a second axial direction opposite the first axial direction against a second portion of the first acid ring opposite the first portion of the acid ring to shape the first acid ring, wherein driving the first and second forming members against the battery part includes flaring at least a portion of the first acid ring to form an undercut region between the first and second acid rings.

5. The method of claim 4 wherein the first forming member includes a first recess with a first protrusion, and wherein the second forming member includes a second recess with a second protrusion.

6. The method of claim 5 wherein the first protrusion is configured to contact the first portion of the first acid ring, and wherein the second protrusion is configured to contact the second portion of the first acid ring.

7. A method of making a battery terminal comprising:
   forming an acid ring having a first lip and a second lip, wherein the first lip and the second lip each include a lateral surface and an angled surface, and wherein the lateral surface and the angled surface have an included angle less than 90 degrees; and
   flaring the first lip away from the second lip to form a sealing region on the individual lateral surfaces.

8. The method of claim 7 wherein forming the acid ring comprises casting the battery terminal in a mold.

9. The method of claim 7, further comprising:
   placing the battery terminal in a collet having a first radius of curvature that is substantially the same as a second radius of curvature of the acid ring; and
   collapsing the collet to radially compress the individual lips to form the sealing region on the lateral surfaces of the corresponding lips.

10. The method of claim 7 wherein flaring the first lip away from the second lip comprises radially striking the angled surfaces to form the sealing region on the corresponding lateral surfaces.

11. The method of claim 7 wherein flaring the first lip away from the second lip comprises placing the battery terminal in a hopper containing free particles for randomly impinging on the angled surfaces to thereby flare the corresponding lips.

12. The method of claim 7 wherein flaring the first lip away from the second lip comprises impacting the individual angled surfaces with a peening member to form the sealing region on the corresponding lateral surfaces.

13. The method of claim 7 wherein the angled surface of the first lip and the angled surface of the second lip are formed in a V-shaped groove.

14. The method of claim 7 wherein the acid ring is a first acid ring, and further comprising forming at least a second acid ring having at least two circumferential lips.

15. The method of claim 7 wherein flaring the first lip away from the second lip comprises applying a radially compressive force insufficient to bend the lip into a hook.

16. The method of claim 7 wherein flaring the first lip away from the second lip further comprises forming a first end surface on the first lip and a second end surface on the second lip.

17. The method of claim 16 wherein the first end surface and the second end surface are separated by the angled surface of the first lip and the angled surface of the second lip.

18. The method of claim 7 wherein flaring the first lip away from the second lip comprises locating the angled surfaces of the first and second lips at approximately a ninety degree angle to each other.

19. The method of claim 1 wherein the first forming member includes a first recess with a first protrusion, and wherein the second forming member includes a second recess with a second protrusion.

20. The method of claim 19 wherein the first protrusion is configured to contact the first portion of the acid ring, and wherein the second protrusion is configured to contact the second portion of the acid ring.

* * * * *